Nov. 25, 1952 B. ADLER 2,619,618
ENERGY STORAGE COUNTER
Filed Jan. 7, 1950
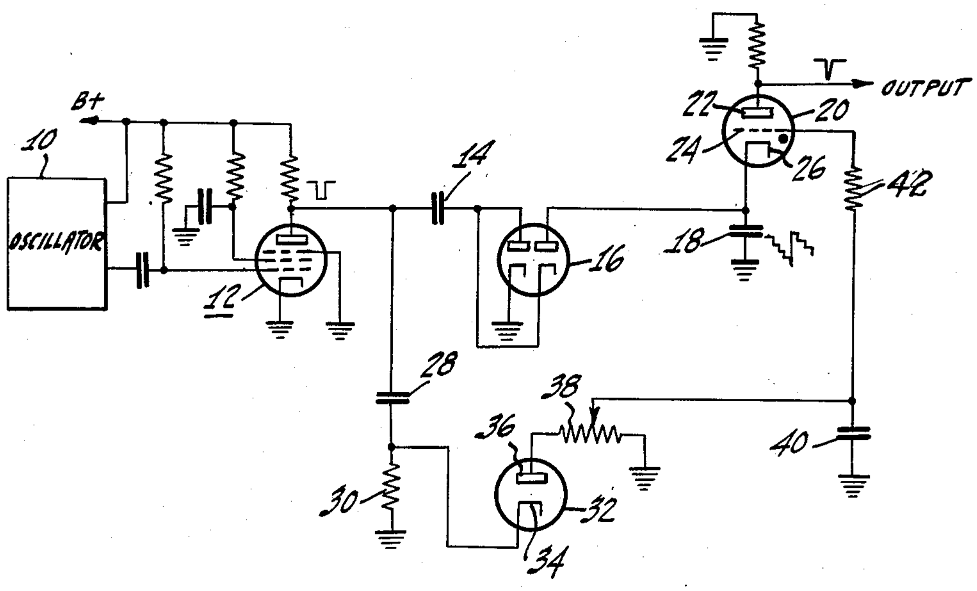
Inventor
BERNARD ADLER
By Morris ? Rabkin
Attorney Patented Nov. 25, 1952 2,619,618

UNITED STATES PATENT OFFICE 2,619,618

ENERGY STORAGE COUNTER

Bernard Adler, Haddon Heights, N. J., assignor to Radio Corporation of America, a corporation of Delaware Application January 7, 1950, Serial No. 137,341

7 Claims. (Cl. 315—238)

This invention relates to energy storage step counters. More particularly, this invention is an improvement in the stabilization of energy storage step counters.

Energy storage step counters of the type wherein successive voltage pulses to be counted are applied through a first condenser and an isolating rectifier to a storage condenser, and a discharge device is connected to the storage condenser to be discharged thereby upon the occurrence of a predetermined number of pulses, are well known. This type of counter circuit is described in a Patent No. 2,113,011, issued April 5, 1938, for "Thermionic Valve Apparatus" to E. L. C. White. The discharge device is usually given a fixed bias and is caused to discharge by virtue of the fact that each pulse, which is counted, stores a portion of its energy content in the storage condenser and when the level of the stored energy reaches a level which overcomes the bias the discharge device is triggered.

Variations in the energy stored in the storage condenser from each pulse can cause miscounts. These variations may be attributable to pulse amplitude variations, due to aging of components, variations in tube plate and filament voltages and changes caused by replacement of tubes.

It is an object of my present invention to provide an improved energy storage step counter which maintains an accurate count for variations in counting pulse amplitudes.

It is a further object of my present invention to provide an improved energy storage step counter which is more stable than heretofore.

The various factors which cause miscounts may be compensated for each time by adjusting the various circuit components of the counter or the bias applied to the discharge device.

It is still a further object of my present invention to provide an improved energy storage step counter which provides a bias which automatically compensates for variations in counting pulse amplitudes.

These and further objects of the present invention are achieved by providing an energy storage step counter wherein the bias of the discharge device is derived by detection of a sample of the pulses being counted which varies in amplitude in proportion to counting pulse amplitude. The bias of the discharge device thus follows the counting pulse amplitude and a correct count is maintained thereby.

The novel features of the invention as well as the invention itself, both as to its organization and method of operation, will best be understood from the following description, when read in connection with the accompanying drawing which is a circuit diagram of an energy storage step type of counter embodying the present invention.

A source of sequential pulses to be counted is provided by an oscillator 10 which is coupled to a shaper stage 12. The pulse shaping stage 12 generates negative pulses which are applied to a first condenser 14, through one half of the double diode 16 and to a storage condenser 18. The energy in each of the applied negative pulses is divided between the first condenser 14 and the storage condenser 18 substantially in accordance with the value of their capacities.

After the pulse has passed, the first condenser 14 discharges through the other half of the diode 16 to ground. However, the storage condenser 18 holds the voltage applied across it since it cannot discharge back through the diode 16 in view of the polarity of its voltage charge. Subsequent pulses from the pulse source keep adding increments of voltage to the voltage already stored on the storage condenser, until it reaches a predetermined level which is fixed in accordance with the desired count.

A discharge device, consisting of a gas tube 20 having its anode 22 connected to ground through a load resistor, its grid 24 connected to an automatic biasing circuit to be presently described, has the storage condenser 18 connected in series with its cathode 26. When the voltage on the storage condenser 18 exceeds the cutoff bias value of the gas tube 20, the gas tube is fired, storage condenser 18 is discharged and the count can be started again.

If a fixed cutoff bias is applied to the gas tube as has been done heretofore, variations in the amplitude of applied pulses causes variations in the energy stored in the storage condenser by each pulse thus causing the gas tube to be fired sooner or later than proper. This may be cured, for wide variations of pulse amplitude, by detection of sample voltages, of the applied pulses, which have proportionate amplitude changes, and by applying the detected voltages to the gas tube grid as a cut-off bias which varies with the pulse amplitude change and compensates the counter. A coupling condenser 28 and a resistor 30 are connected in series across the pulse source output. A diode rectifier 32 has its cathode 34 connected to the junction of the resistor 30 and the condenser 28. The anode 36 of the rectifier 32 is connected in series with a potentiometer 38. The movable arm of the potentiometer is connected to a bias condenser 40 and through a coupling resistor 42 to the grid 24 of the gas tube.

The combination of the rectifier 32, the resistor 30, the potentiometer 38 and the condenser 40 serve to detect a sample of the negative counting pulse. The potentiometer is adjusted so that the cut-off point of the gas tube is as desired. The bias then follows the pulse amplitudes and the gas tube will substantially always be discharged at the arrival of the correct number of pulses to be counted.

It is to be noted that the anode 22 of the gas tube 20 is connected to ground through a load resistor and that the gas tube is discharged by the voltage applied from the storage condenser 18. This is a preferred connection of the discharge device and provides the most stable counter. However, this pulse detection system of biasing may also be used in the situation where the gas tube anode is connected to a source of B+. With the gas tube anode connected to a B+ source this pulse peak detection system of biasing is also effective, but not over as wide a range of voltage changes as in the preferred embodiment. Further, slight bias adjustments are required with tube changes. This is not required in the preferred embodiment. The system shown in the drawing is an average pulse amplitude detecting device. If a greater value of biasing voltage is required a diode may be used to discharge condenser 28 between pulses by connecting the anode to the junction point between condenser 28 and resistor 30 and its cathode to ground. This system then detects the peaks of the counting pulses and the bias is automatically varied accordingly.

From the foregoing description it will be readily apparent that I have provided an improved energy storage step counter which automatically compensates for changes in the amplitude of the counting pulses to provide accurate counts. Although only a single embodiment of my invention has been shown and described, it should be apparent that many changes may be made in the particular embodiment herein disclosed, and that many other embodiments are possible, all within the spirit and scope of my invention. Therefore, I desire that the foregoing description be taken as illustrative and not as limiting.

What is claimed is:

1. In an energy storage step counter of the type wherein successive voltage pulses to be counted are impressed on a storage condenser and a discharge device is discharged responsive to a predetermined number of said voltage pulses impressed on said condenser, the combination therewith of means to stabilize said counter comprising means to detect sample voltages of said successive voltage pulses which vary in amplitude proportionately to said voltage pulse amplitudes, and means to apply said sample voltages to said discharge device as a bias, said bias varying in proportion to the amplitudes of said successive voltage pulses to compensate said discharge device for variations in said amplitudes.

2. In an energy storage step counter of the type wherein a gas tube has anode, cathode and control grid electrodes, a storage condenser is connected in series with said cathode, and successive voltage pulses to be counted are impressed on said storage condenser to discharge said gas tube upon the occurrence of a predetermined number of said pulses, the combination therewith of means to stabilize said counter comprising means to detect sample voltages of said successive voltage pulses, which vary in amplitude proportionately to said voltage pulses, and means to impress said sample voltages upon said gas tube grid to bias said gas tube in proportion to the amplitude of said successive voltage pulses.

3. The combination recited in claim 1 wherein said means to detect comprises a rectifier, a resistor in series with said rectifier and a condenser in parallel with a portion of said resistor.

4. In an energy storage step counter of the type having a gas tube with anode, cathode and control grid electrodes, a storage condenser connected in series with said cathode, and a source of successive voltage pulses to be counted coupled to said storage condenser to discharge said gas tube upon the occurrence of a predetermined number of said pulses, the combination therewith of means to stabilize said counter comprising a rectifier, means coupling said rectifier to said source, a resistor in series with said rectifier, a condenser in parallel with said resistor, and means coupling said condenser to said gas tube control grid to apply voltages appearing across said condenser to said control grid as a bias varying with the amplitude of said successive voltage pulses.

5. In an energy storage step counter of the type having a gas tube with anode, cathode and control grid electrodes, a storage condenser connected in series with said cathode, and a source of successive voltage pulses to be counted coupled to said storage condenser to discharge said gas tube upon the occurrence of a predetermined number of said pulses, the combination therewith of means to stabilize said counter comprising a rectifier having an anode and cathode, means coupling said rectifier cathode to said source, a resistor connected in series with said rectifier anode, a condenser connected in parallel with a portion of said resistor, and means coupling said condenser to said gas tube control grid to apply voltages appearing across said condenser to said control grid as a bias varying in proportion with the amplitude of said successive voltage pulses.

6. In an energy storage step counter having a (1) first condenser coupled to a source of successive voltage pulses to be counted, (2) a rectifier, (3) a storage condenser coupled to said source through said first condenser and said rectifier to be charged therefrom, and (4) a gas tube having anode, cathode and control grid electrodes, said storage condenser being coupled to said gas tube cathode to discharge said gas tube upon the occurrence of a predetermined number of said successive voltage pulses, the combination therewith of means to stabilize said counted comprising a coupling condenser, a first resistor connected at a junction point in series with said coupling condenser, said series connected coupling condenser and first resistor being connected across said source, a rectifier having an anode and a cathode, said rectifier cathode being connected to said first resistor and coupling condenser junction point, a potentiometer having a movable arm, said potentiometer having one end connected to said rectifier anode, a bias condenser connected between said potentiometer movable arm and the other end of said potentiometer, and means to couple said potentiometer movable arm to said gas tube control grid to apply voltages appearing across said bias condenser as a bias varying in proportion with the average amplitude of said successive voltage pulses.

7. In an energy storage step counter having a (1) first condenser coupled to a source of successive voltage pulses to be counted, (2) a rectifier, (3) a storage condenser coupled to said source through said first condenser and said rectifier to be charged therefrom, and (4) a gas tube having anode, cathode and control grid electrodes, said storage condenser being coupled to said gas tube cathode to discharge said gas tube upon the occurrence of a predetermined number of said successive voltage pulses, the combination therewith of means to stabilize said counter comprising a coupling condenser, a first resistor connected at a junction point in series with said coupling condenser, said series connected coupling condenser and first resistor being connected across said source, a first rectifier having an anode and a cathode, said first rectifier anode being connected to said junction point, said first rectifier cathode being connected to the other end of said resistor, a second rectifier having an anode and a cathode, said second rectifier cathode being connected to said junction point, a potentiometer having a movable arm, said potentiometer having one end connected to said second rectifier anode, a bias condenser connected between said potentiometer movable arm and the other end of said potentiometer, and means to couple said potentiometer movable arm to said gas tube control grid to apply voltages appearing across said bias condenser as a bias varying in proportion with the peak amplitude of said successive voltage pulses.

BERNARD ADLER.

REFERENCES CITED

The following references are of record in the file of this patent:

UNITED STATES PATENTS

| Number | Name | Date |
|---|---|---|
| 2,233,761 | Anderson | Mar. 4, 1941 |
| 2,413,440 | Farrington | Dec. 31, 1946 |
| 2,415,567 | Schoenfeld | Feb. 11, 1947 |
| 2,470,303 | Greenough | May 17, 1949 |